United States Patent

[11] 3,610,645

| [72] | Inventor | John J. Roddy<br>Meriden, Conn. |
|---|---|---|
| [21] | Appl. No. | 863,790 |
| [22] | Filed | Oct. 6, 1969 |
| [45] | Patented | Oct. 5, 1971 |
| [73] | Assignee | Cushman Industries, Incorporated<br>Hartford, Conn. |

[54] CHUCK OF WEDGE-ACTUATED JAW TYPE
5 Claims, 5 Drawing Figs.

[52] U.S. Cl. ................................................ 279/60,
279/66, 279/121
[51] Int. Cl. .................................................... B23b 31/16
[50] Field of Search .......................................... 279/121,
110, 66, 60, 65

[56] References Cited
UNITED STATES PATENTS

| 1,786,147 | 12/1930 | Bullard | 279/121 |
|---|---|---|---|
| 2,831,695 | 4/1958 | Dearborn | 279/121 UX |
| 2,845,276 | 6/1958 | Skillin | 279/121 |
| 2,854,240 | 9/1958 | Parker et al. | 279/121 |
| 3,248,122 | 4/1966 | Roddy | 279/110 |

Primary Examiner—William S. Lawson
Assistant Examiner—James F. Coan
Attorney—Walter Spruegel ABSTRACT: A chuck having in its body at least one guided jaw, and a jaw-actuating wedge in the form of a cylindrical stud formation at the forward end of a cylindrical shank which is guided in the chuck body for movement axially thereof, with the stud formation being inclined to the chuck axis at the desired wedge angle and fittedly received in a cylindrical bore in the jaw.

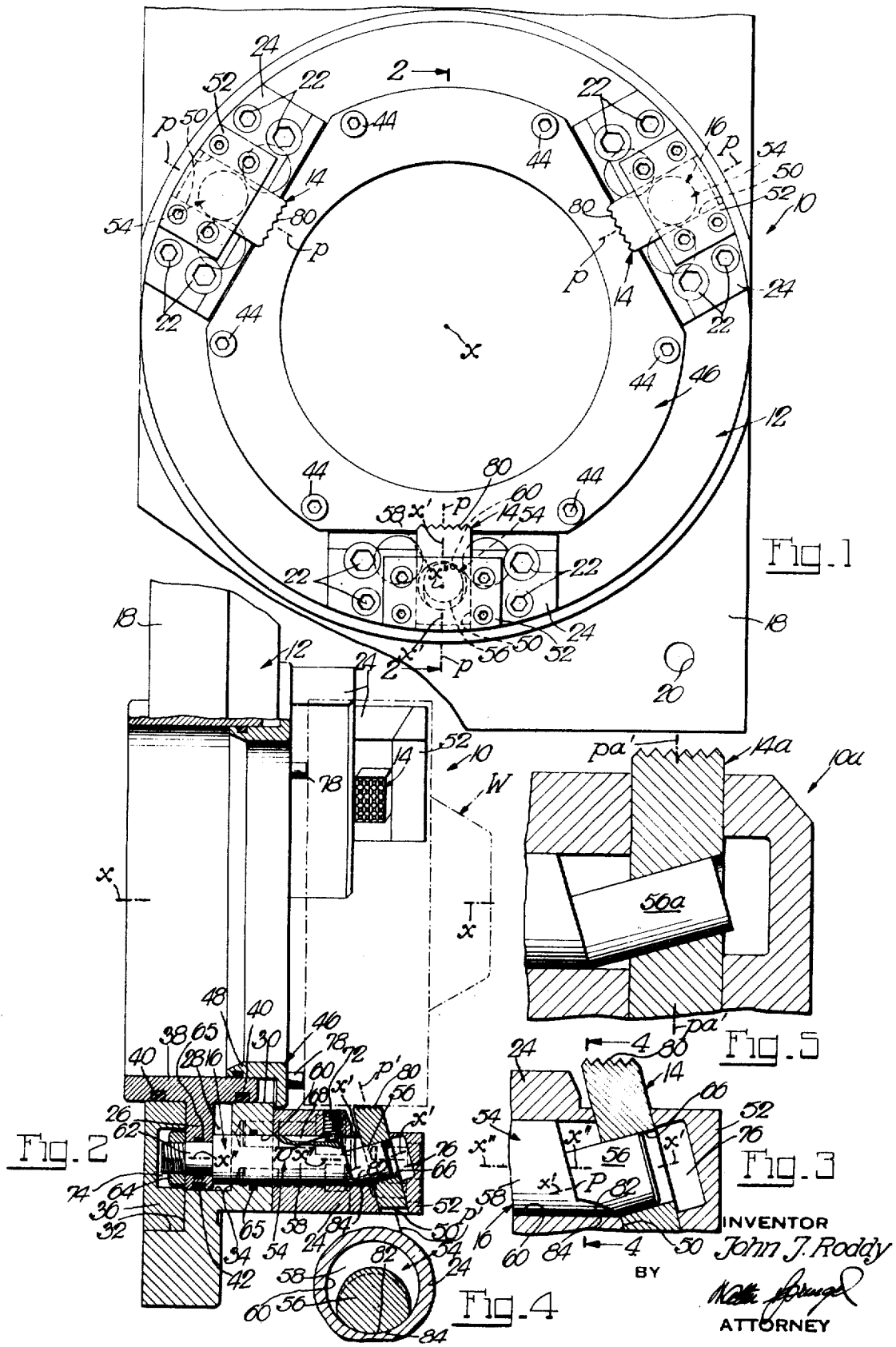
PATENTED OCT 5 1971
3,610,645
INVENTOR
John J. Roddy
BY
ATTORNEY

CHUCK OF WEDGE-ACTUATED JAW TYPE

This invention relates to chucks in general, and to chucks of wedge-actuated jaw type in particular.

It is among the objects of the present invention to provide a chuck of this type which is of particularly simple and low-cost construction, yet is highly accurate in its performance for a long time.

It is another object of the present invention to provide a chuck of this type in which the jaw-actuating wedges are in the form of cylindrical studs with rearward shanks, of which the shanks are guided in the chuck body for movement axially of the chuck, and the cylindrical studs are inclined to the chuck axis at the desired wedge angle, with these studs being received with a sliding fit in cylindrical bores in the associated guided jaws for movement of the latter into and from gripping engagement with work on back-and-forth movement of the studs with their shanks. These cylindrical wedge studs and the cylindrical reception bores therefor in the jaws are not only readily machined within easily kept very close tolerances in their size and wedge angle, but they also afford follower engagement with each other over their entire peripheries. As a result, wedge cooperation between these studs and associated jaws is not only highly accurate, subject to little wear, and achieved at particularly low cost, but is also highly uniform and smooth as well as positive throughout the motion range of the jaws and in either direction of movement of the latter. Moreover, with these wedges studs being in follower engagement with the associated jaws within the latter, it is entirely feasible to make the jaws at least over their guided length, and preferably throughout their length, of uniform rectangular cross section, which makes for great structural simplicity and low cost of the jaws and their guidance in the chuck body, as well as for movement of the jaws and their grip on work without any binding tendency of the same in their guideways. Further by virtue of the wedge studs being in follower relation with the associated jaws entirely within the latter, it is feasible to make the jaws of minimum length, i.e., without regard to their wedge actuation and with sole regard to affording them adequate guided support in the chuck body which makes for condensed and lightweight construction of the chuck.

It is a further object of the present invention to provide a chuck of this type in which the aforementioned shanks of the wedge studs are also cylindrical, wherefore each shank and stud part is easily and accurately machinable at very low cost, and the shanks require for their guidance in the chuck body mere cylindrical bores.

Another object of the present invention is to provide a chuck of this type which has all the advantages of the aforementioned wedge stud actuation of the jaws, and in which the operating parts are further arranged so that all operational stresses of the higher magnitudes in the chuck are compressive stresses. With this further arrangement, the operational stresses in the chuck are easily kept within entirely tolerable limits for a work-clamping force of most any magnitude, and objectionable give or other strain manifestations of chuck parts are avoided, with chuck parts being, moreover, subject to little wear, all of which makes still further for highly accurate and long-enduring performance of the chuck.

A further object of the present invention is to provide a chuck of this type in which all operational stresses of the higher magnitudes are compressive stresses as aforementioned, by coordinating the wedge studs and associated jaws so that the wedge studs are solidly backed against the chuck body within the extent of the work-gripping surfaces of the jaws axially of the chuck. To this end, each wedge stud is machined at the side thereof facing away from the chuck axis and over part of its length next to its shank to provide thereat a rest surface which is supported on a machined bearing surface in the chuck body for sliding movement thereon axially of the chuck, and to guide each jaw in the chuck body for movement normal to the inclined axis of the associated wedges stud to thereby bring at least part of its work-gripping surface into radical alignment with the rest surface of the wedge stud over the extent of its bearing support in the chuck body. With this arrangement, solid backup of the jaws against the chuck body is achieved with the utmost structural simplicity, requiring no additional parts, and even requiring no additional machining if the rest surface in each wedge stud is a preferred continuation of the machined cylindrical periphery of its shank into the stud, wherefore the cost of this chuck is as low as that of the same chuck without solid jaw backup against the chuck body. Moreover, by virtue of the guided movement of the jaws at an inclination to the chuck axis, the chuck functions in drawdown fashion in that the jaws force work against a back stop if such is provided on the chuck body.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary front view of a chuck embodying the present invention;

FIG. 2 is a section through the chuck taken on the line 2—2 of FIG. 1;

FIG. 3 is an enlarged fragmentary section through part of the chuck;

FIG. 4 is a section taken substantially on the line 4—4 of FIG. 3; and

FIG. 5 is a fragmentary section through part of a chuck embodying the invention in a modified manner.

Referring to the drawings, and more particularly to FIGS. 1 to 3 thereof, the reference numeral 10 designates a chuck having a chuck body 12 with an axis $x$ on which to center work, a plurality of jaws 14, and jaw-actuating mechanism 16.

The chuck body 12 has in this instance a rectangular base 18 with holes 20 for bolting the chuck to an exemplary stationary support for operating on gripped work W with a moving tool or tools, such as a drill or milling cutter, for example, and provided on the base, and in this instance bolted thereto as at 22, are forwardly projecting support parts 24 for the jaws and the jaw-actuating mechanism. For operation of the jaw-actuating mechanism 16 there is provided a draw bar in the exemplary form of a plunger 26 in a pneumatic cylinder 28 which is ring shaped and formed in the rear of the chuck body 12. To this end, the body 12 is in this instance provided with a central cylindrical aperture 30 and stepped annular rear recesses 32 and 34, and a ring-shaped cover plate 36 is received and suitably mounted in the recess 32 to confine the cylinder space 28 to the recess 34. This ring-shaped cylinder space 28 is closed at its inner end by exemplary ring base 38 of the plunger 26, with the plunger being formed as an outward flange on the ring base 38 and the latter being axially slidable in the center aperture 30 in the chuck body and in the cover plate 36. Suitable ports (not shown) for compresses air lead to the cylinder space 28 on opposite sides of the plunger 26 therein, and suitable gaskets 40 are provided to prevent leakage of operating air from the cylinder 28, with the plunger 26 being also provided with a gasket 42 to prevent leakage of operating air from either side of the cylinder to the opposite side thereof. Suitably mounted on the chuck body as at 44 is a ring guard 46 with a rearward flange 48 that overlaps the ring base 38 of the plunger 26, with the ring guard 46 serving to keep chips and dirt from the bearing support of the plunger base 38. The ring-shaped plunger base 38 and ring guard 46 thus afford a larger aperture in the chuck into and through which may extend work W being operated on.

The parts 24 of the chuck body provide guideways 50 for the jaws 14, and they are retained therein by caps 52, with each jaw being guided for rectilinear movement in a plane $p$ in which the axis $x$ lies and which in this instance is also tee median plane of the jaw (FIG. 1).

The jaw-actuating mechanism 16 includes the described cylinder and plunger 28, and further provides simple actuator parts 54, one for each jaw, with each part 54 featuring a cylindrical wedge stud 56 with a shank 58. The shank 58 of each actuator part 54 is guided in the chuck body for movement parallel to the chuck axis $x$, and the axis $x'$ of each wedge stud 56 lies in a plane parallel to, and preferably and advantageously in, the plane $p$ of associated jaw (FIG. 1), and is inclined to the chuck axis $x$ at a desired wedge angle (FIGS. 2 and 3). The shank 58 of each actuator part 54 is preferably and advantageously also cylindrical, and requires for its guidance in the chuck body a mere cylindrical bore 60 therein. Preferably, the axis $x''$ of each shank 58 lies in the same plane $p$ in which the axis $x'$ of its wedge stud 56 lies (FIG. 1). The shank 58 of each of the actuator parts 54 is connected with a plunger 26, and to this end has a reduced end 62 extending through the plunger and receiving a nut 64 (FIG. 2). Additional gaskets 65 are provided to prevent leakage of operating air form the cylinder 28 along the shank 58 of each actuating part 54. For cooperation of the wedge stud 56 of each actuator part 54 with the associated jaw 14, the latter merely requires a cylindrical bore 66 in which the wedge stud is received with a sliding fit. If desired, the shank 58 of each actuator part 54 may further be held against turning movement by being provided with a keyway 68 into which projects a key end 70 of a screw 72 in the chuck body.

For operation of the chuck, compresses air is admitted to the right end of the cylinder 28 (FIG. 2) to force the plunger 26, and with it the actuator parts 54, to the left, but short of the end position shown in FIG. 2, in order to move the jaws 14 into gripping engagement with work, as will be readily understood. Conversely, on venting the right end of the cylinder 28 and admitting compressed air into the left end thereof (FIG. 2), the plunger 26 and actuator parts will be shifted to the right, with ensuing retraction of the jaws from work and release of the latter from the chuck. To permit the described operational movement of the plunger 26 and actuator parts 54, the rear cover plate 36 and the jaw-retaining caps 52 are provided with clearance apertures 74 and 76 for the shank ends 62 and nuts 64 thereon and for the wedge studs 56, respectively.

The jaws 14 are in this instance also guided for movement in a plane $p'$ (FIG. 2) which extends normal to the described plane $p$ (FIG. 1) and is inclined to the chuck axis $x$ wherefore the jaws have a featured combined gripping and draw-down action on work, with their draw-down action forcing work W being gripped into firm backup against exemplary stops 78 on the chuck. Preferably, the plane $p'$ in which each jaw is guided extends normal to the axis $x'$ of the associated wedge stud 56. However, the explained inclination of the jaws leads to still another and far more important feature of solid backup of the gripping jaws against the chuck body within the extent of their work-gripping surface 80 axially of the chuck through intermediation of the associated wedge studs 56. To this end, each wedge 56 is undercut on the side thereof facing away from the chuck axis $x$ and over part of its length next to its shank 58 to provide thereat a rest surface 82 (FIGS. 2 to 4), and provide in each body part 24 is a bearing surface 84 which extends parallel to the chuck axis $x$ and leads to the jawway 50 therein, with the rest surface 82 being shaped for a slide fit on the bearing surface 84. Thus, with the described inclination of the jaws 14 to the chuck axis $x$ being further such as to bring at least part of the work-gripping surface 80 of each jaw into alignment with the rest surface 82 on the associated wedge stud 56 radially with respect to the chuck axis $x$ (FIGS. 2 and 3), the bearing surface 84 is the effective backup surface in the chuck body for the respective jaw. With this arrangement, the operational stresses in the jaws in gripping work are primarily compressive stresses, with other stresses such as bending stresses being negligible, and these compressive stresses do not give rise to objectionable give or other strain manifestations of chuck parts, including the chuck body.

As shown in FIG. 4, the rest surface 82 on each wedge stud 56 and the coordinated bearing surface 84 in the chuck body are part-cylindrical surfaces. Preferably and advantageously, the shank 58 of each actuating part 54 is of larger diameter than its wedge stud 56, and the latter is conveniently machined in the shank with its axis $x'$ *being at its projection P from the shank offset from the axis $x''$* of the latter sufficiently so that the rest surface 82 on the wedge stud is a continuation of the cylindrical periphery of the shank into the stud (FIGS. 2 to 4), whereby the bearing surface 82 is advantageously formed by the cylindrical bore 60 in which the shank is slidably supported. With this arrangement, each actuator part 54 is of exceeding simple and low-cost construction, and is easily machined at very close tolerances for optimum accuracy in its performance. Machining of the other chuck parts, including chuck body, is also very simple and easily kept within fairly close tolerances, and the operational principle of the chuck makes for minimum operational wear of the operating parts thereof, wherefore the chuck performance is highly accurate for a long time. Further, since the featured jaw actuators 54 require for their actuation of the jaws cylindrical bores within the latter, the length of the jaws may be determined without any regard to these actuators 54 and with sole regard to their adequate guidance support in the chuck body, wherefore the jaws may be particularly short which further makes for condensed and lightweight construction of the chuck. Moreover, and further by virtue of the cylindrical bores in the jaw for their cooperation with the actuators 54, the jaws themselves may advantageously be throughout their length of simple and uniform cross section, which makes for stuctual simplicity and low cost of the jaws. Also, with this arrangement of the jaws and their associated wedge studs, the jaws have virtually no binding tendency in their guideways on closing on work.

While in the described chuck 10 of FIGS. 1 to 4 the arrangement of the jaws 14 and their actuators 54 provides the additional feature of solid backup of the gripping jaws on the chuck body through intermediation of the associated wedge studs, the jaw actuators are applicable to chucks without this additional feature but will all other described advantages. Thus, FIG. 5 shows a modified chuck 10a in which each wedge stud 56a is cylindrical throughout its length and, hence, devoid of a rest surface. Also each jaw 14a is in this instance guided for movement in a plane $pa'$ which extends normal to the chuck axis so that the jaws have no draw-down action on work. However, if desired, the jaws 14a may have such draw-down action on work by simply guiding them for movement in a plane which is inclined to the chuck axis, as will be readily understood.

What is claimed is:

1. In a chuck the combination with at least one movable jaw with a work-gripping surface, and a body having an axis and a guideway in which said jaw is movable rectilinearly to and from said axis in a first plane in which said axis lies, of a jaw actuator providing a cylindrical stud with a rearward shank, guide means in said body for movement of said shank parallel to said axis, with said stud extending with its axis in said first plane and at an inclination to said body axis, and said stud being undercut on the side thereof facing away from said body axis and over part of its length next to said shank to provide a rest surface thereat, and a bearing surface in said body leading to said guideway and extending parallel to said body axis, with said rest surface being shaped for a slide fit with said bearing surface, said jaw having a cylindrical bore for reception of said stud with a slide fit whereby on movement of said shank in opposite directions said stud moves said jaw to and from said body axis, and said guideway is arranged for further guidance of said jaw in another plane normal to said first plane and inclined to said body axis to bring at least part of its work-gripping surface into radial alignment with the bearing support of said rest surface in said body for solid backup of said jaw in said body through intermediation of said stud.

2. The combination in a chuck as in claim 1, in which said first plane is the median plane of said jaw.

3. The combination in a chuck as in claim 2, in which said rest and bearing surfaces are part cylindrical.

4. The combination in a chuck as in claim 2, in which said shank is cylindrical and of larger diameter than said and extends with its axis in said plane in which said stud axis lies, said stud is a machined end of said shank so offset from the axis of said shank at its projection from the latter that said rest surface is formed by a continuation of the cylindrical shank periphery into said stud, and said guide means and bearing surface in said body are formed by a cylindrical bore therein.

5. A wedge-type jaw actuator for a chuck, comprising a cylindrical stud with an integral cylindrical rearward shank of larger diameter that said stud, with the axes of said stud and shank lying in a common plane and forming an obtuse angle with each other, and said stud is a machined end of said shank so offset from the axis of said shank at its projection from the latter that the cylindrical periphery of said shank continues into said stud over part of its length, and a jaw with a side and opposite ends and having a work-gripping surface at one end and a cylindrical bore in said side for reception of said stud with a sliding fit.